US010887525B2

(12) United States Patent
Candelore

(10) Patent No.: US 10,887,525 B2
(45) Date of Patent: Jan. 5, 2021

(54) DELIVERY OF NOTIFICATIONS FOR FEEDBACK OVER VISUAL QUALITY OF IMAGES

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/292,494

(22) Filed: Mar. 5, 2019

(65) Prior Publication Data
US 2020/0288066 A1    Sep. 10, 2020

(51) Int. Cl.
H04N 5/232 (2006.01)
G06K 9/32 (2006.01)
G06K 9/00 (2006.01)

(52) U.S. Cl.
CPC ... H04N 5/232941 (2018.08); G06K 9/00315 (2013.01); G06K 9/3233 (2013.01); H04N 5/23245 (2013.01); H04N 5/23299 (2018.08); H04N 5/232935 (2018.08)

(58) Field of Classification Search
CPC ....... H04N 5/232941; H04N 5/232935; H04N 5/23299; H04N 5/23245; G06K 9/3233
See application file for complete search history.

(56) References Cited

U.S. PATENT DOCUMENTS 6,301,440 B1 * 10/2001 Bolle ................. G06K 9/00664
348/229.1
8,638,372 B2 1/2014 Yoshizumi
2004/0207743 A1 * 10/2004 Nozaki ............. H04N 5/23212
348/333.12
2010/0194912 A1 * 8/2010 Terashima ............. G03B 13/14
348/222.1
2011/0249133 A1 * 10/2011 Zhou ...................... H04N 5/232
348/222.1
2012/0081560 A1 * 4/2012 Park ................... H04N 5/23219
348/208.12
2016/0014349 A1 * 1/2016 Peterson ............ H04N 5/23212
348/222.1

FOREIGN PATENT DOCUMENTS

JP    2007-049631 A    2/2007

* cited by examiner

Primary Examiner — Ahmed A Berhan
(74) Attorney, Agent, or Firm — Chip Law Group

(57) ABSTRACT

An electronic apparatus, method, and non-transitory computer-readable medium are provided for delivery of notifications for feedback over visual quality of images. The electronic apparatus determines, from a plurality of categories, a category of the image frame based on imaging information associated with the image frame or an object of interest. The electronic apparatus selects a set of scoring parameters for the image frame from a plurality of scoring parameters based on the determined category. The set of scoring parameters corresponds to a defined visual quality for the determined category. The electronic apparatus estimates score information for the set of scoring parameters based on deviation of a value of at least one scoring parameter of the selected set of scoring parameters from a set of threshold values. The electronic apparatus outputs a notification based on the score information. The notification corresponds to feedback on a visual quality of the image frame.

20 Claims, 5 Drawing Sheets

DELIVERY OF NOTIFICATIONS FOR FEEDBACK OVER VISUAL QUALITY OF IMAGES

CROSS-REFERENCE TO RELATED APPLICATIONS/INCORPORATION BY REFERENCE

None.

FIELD

Various embodiments of the disclosure relate to camera technologies. More specifically, various embodiments of the disclosure relate to delivery of notifications for feedback over visual quality of images.

BACKGROUND

Recent advancements in camera technologies have led to development of various techniques that provides a user with the capability to capture images that accurately represent desirable objects and have a desirable photography composition. Typically, images captured by a conventional image capture device can have various quality issues due to factors, such as overexposure, motion blur, camera out-of-focus, dust spots, disorientated camera, incomplete faces, and undesired facial features in captured images. These factors may arise due to incorrect settings or configuration of the conventional image capture device, mishandling of the conventional image capture device, or issues with objects that may be of interest to the user at a time when the images are captured to include the objects. Conventionally, in order to detect quality issues in images and take corrective measures, the user may have to manually analyze errors associated with quality of the images. The identification of errors may be required to correct any anomaly in those images and improve the quality. Manual analysis may often lead to inaccuracy in identification of the errors. Also, the user may not be able to correct certain errors and may require a retake of the images, which may be undesirable for the user. In certain scenarios, the user may also lose the opportunity to capture another image with an improved the image quality.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus, a method, and a non-transitory computer-readable medium for delivery of notifications for feedback over visual quality of images is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in a disclosed electronic apparatus, a method, and a non-transitory computer-readable medium for delivery of notifications for feedback over visual quality of image frames. Exemplary aspects of the disclosure provide an electronic apparatus that may check visual quality of each image frames of a plurality of image frames and notifies a user of the electronic apparatus about the visual quality of each image frame of the plurality of image frames as feedback. The automated visual quality check by the electronic apparatus may ensure that captured image frames have a desired image quality. This may reduce the need for correction of image quality issues in the post-processing stage. The electronic apparatus may further provide a real time or near real time notifications to the user of the electronic apparatus about any discrepancies in captured image frames. Such notifications may further assist the user to capture another image frame with an improved visual quality.

The electronic apparatus may include a memory configured to store a plurality of image frames, such as a first image frame. The first image frame may include an object of interest, such as an animate object (a person, an animal, etc.), an inanimate object, or a combination thereof. The disclosed electronic apparatus may determine, from a plurality of categories, a first category of the first image frame based on imaging information associated with at least the first image frame or the object of interest. The plurality of categories may correspond to a set of capture modes or a type of scene in a field-of-view (FOV) of an image sensor. The set of capture modes may include, but are not limited to, a landscape mode, a panorama mode, a beautification mode, a self-portrait mode, a wide angle mode, a low light mode, an autofocus mode, and a High-Dynamic-Range (HDR) mode. The disclosed electronic apparatus may select a set of scoring parameters for the first image frame from a plurality of scoring parameters based on the determined first category. The disclosed electronic apparatus may estimate score information for the selected set of scoring parameters based on a deviation of a value of at least one scoring parameter of the selected set of scoring parameters from the set of threshold values. The disclosed electronic apparatus may output a notification based on the estimated score information. The notification may correspond to feedback on a first visual quality of the first image frame. Based on such automated notifications from the electronic apparatus, the user may take appropriate decisions to reshoot the captured first image frame and reduce the detected errors. Alternatively, in some cases, the electronic apparatus may autocorrect or autocalibrate itself and take another shot with an improved image quality. This may ensure overall high-quality of the image frame before or at the time of capturing of the image frames.

Figure 1:
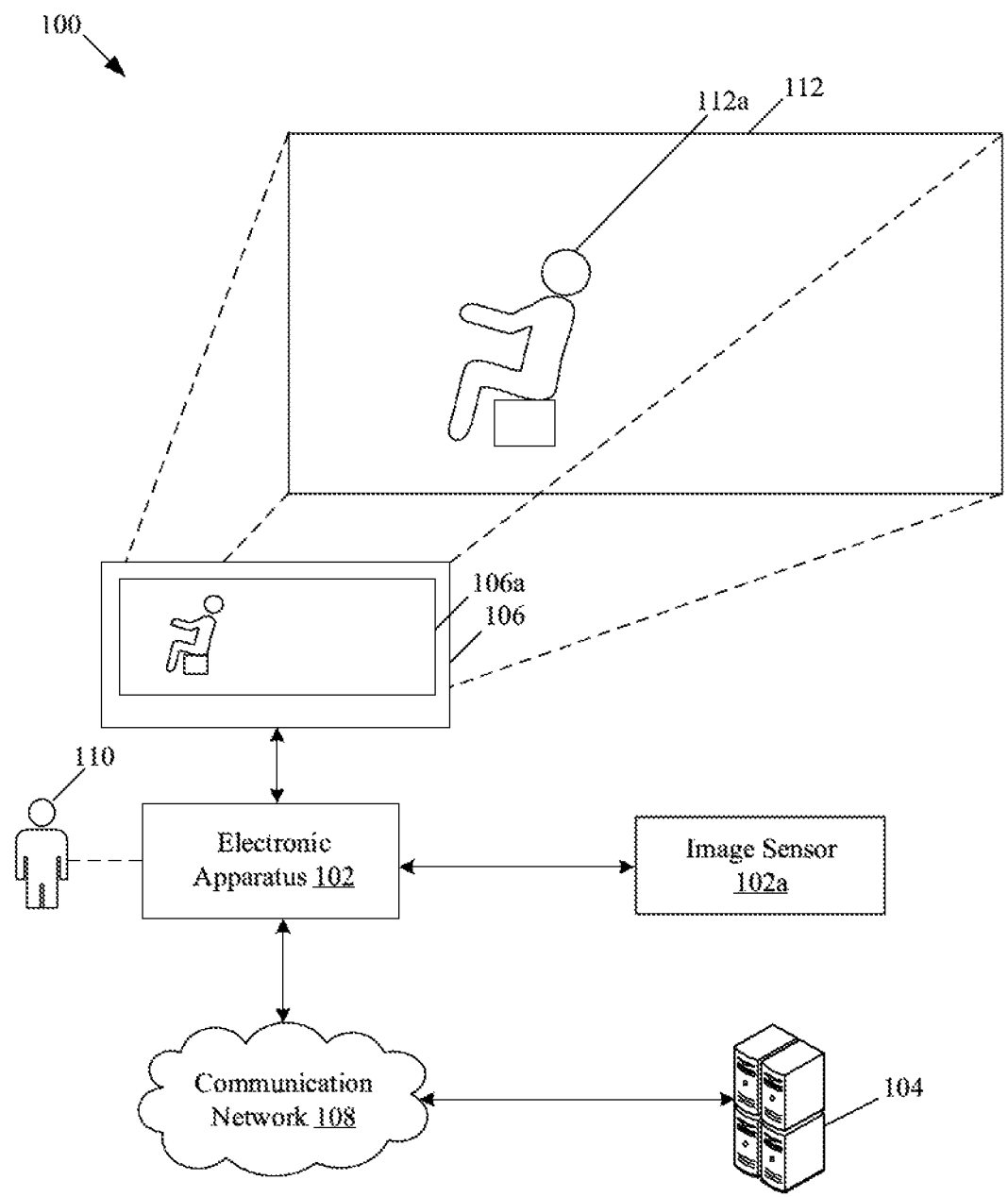
FIG. 1 illustrates an exemplary environment for delivery of notifications for feedback over visual quality of images, in accordance with an embodiment of the disclosure.

FIG. 1 illustrates an exemplary environment for delivery of notifications for feedback over visual quality of images, in accordance with an embodiment of the disclosure. With reference to FIG. 1, there is shown a network environment 100. The network environment 100 may include an electronic apparatus 102, a server 104, and a display device 106. The electronic apparatus 102 may include an image sensor 102a. The electronic apparatus 102 may be communicatively coupled to the server 104, via a communication network 108. There is further shown a user 110 who is associated with the electronic apparatus 102. There is further shown a first image frame (such as the first image frame 112) which may include an object of interest 112a. The first image frame may be displayed on a display area 106a of the display device 106.

The electronic apparatus 102 may comprise suitable logic, circuitry, and interfaces that may be configured to output a notification that may correspond to feedback on a first visual quality of the first image frame. The first image frame may be captured by the image sensor 102a or may be retrieved from the server 104. The notification may help the user 110 to identify issues that may have affected a visual quality of the first image frame. Examples of the electronic apparatus 102 may include, but are not limited to, a digital camera, a video camera, a cellular/mobile phone, a camera phone, a cloud server, a media server, a non-linear editing system (NLE), a non-linear video editing system (NLVE), a video editing system, a video editing controller, a media production system, a computer workstation, a mainframe computer, a handheld computer, a smart appliance, a video player, and/or other computing devices with image processing capability.

The image sensor 102a may comprise suitable logic, circuitry, and/or interfaces that may be configured to capture a plurality of image frames. The captured plurality of image frames may be utilized to determine a first category of the first image frame of the plurality of categories. The image sensor 102a may be positioned at a particular location in three-dimensional (3D) space to capture the plurality of image frames. The image sensor 102a may be implemented using an active pixel sensor, such as a complementary-metal-oxide semiconductor (CMOS) sensor. Alternatively, the image sensor 102a may be implemented using one of a passive pixel sensor (such as a charged coupled device (CCD) sensor, an oversampled binary image sensor, a planar Fourier capture array (PFCA), a back-illuminated (BSI or BI) sensor, and the like. Examples of the image sensor 102a may include, but are not limited to, a wide-angle camera, a depth sensor, an RGB-Depth sensor, an action camera, a closed-circuit television (CCTV) camera, a camcorder, a time-of-flight camera (TOF camera), IR sensor, a fixed-focal length (FFL) camera, a Single-lens reflex camera, a mirror less camera, a movie camera, a stereo camera, a night-vision camera, and a body camera. In FIG. 1, the electronic apparatus 102 includes the image sensor 102a; however, in certain embodiments, the image sensor 102a and the electronic apparatus 102 are separate devices.

The server 104 may comprise suitable logic, circuitry, and interfaces that may be configured to store a plurality of image frames that may include the first image frame. The server 104 may act as a centralized server that stores and transmits the plurality of image frames to the electronic apparatus 102. The server 104 may be further configured to store metadata associated with the plurality of image frames. The metadata associated with the plurality of image frames may include, but are not limited to, information that may indicate a geo-location at which each of the plurality of image frames is captured, information about object(s) of interest, such as an object type, for each of the plurality of image frames, and image information, such as a brightness value and a focus value. In accordance with an embodiment, the server 104 may be implemented as a cloud server which may execute aforementioned operations of the electronic apparatus 102 through web applications, cloud applications, HTTP requests, repository operations, file transfer, gaming operations, and the like. Other examples of the server 104 may include, but are not limited to a database server, a file server, a web server, an application server, a mainframe server, a cloud server, or other types of server.

In FIG. 1, the server 104 is shown as a separate device from the electronic apparatus 102; however, in some embodiments, the electronic apparatus 102 may be a server and aforementioned functionality of the server 104 may be incorporated in the electronic apparatus 102, without a deviation from the scope of the disclosure. In certain scenarios, the server 104 may be managed by one or more of an image hosting service and video hosting service provider, a photo and video-sharing social networking service provider, and/or a cloud storage and cloud computing service provider. In such a case, the electronic apparatus 102 may be configured to retrieve the first image frame from the server 104, via an application-programming interface (API) request.

The display device 106 may comprise suitable logic, circuitry, and/or interfaces that may be configured to render an application interface to display information to the user 110 who is associated with the electronic apparatus 102. The display device 106 may be configured to display a plurality of image frames that may include the first image frame (such as the first image frame 112 that includes the object of interest 112a). In accordance with an embodiment, the display device 106 and the electronic apparatus 102 may be two separate devices. In such a case, the electronic apparatus 102 may control the display device 106 to display a plurality of image frames that may include the first image frame. In some embodiments where the electronic apparatus 102 is a server, the display device 106 may act as a user-end device that may include a display screen and an image sensor to capture the plurality of image frames.

The display device 106 may include the display screen that may be realized through several known technologies that may include, but not limited to, at least one of a Liquid Crystal Display (LCD) display, a Light Emitting Diode (LED) display, a plasma display, and an Organic LED (OLED) display, and other display technologies. In accordance with an embodiment, the display screen of the display device 106 may refer to a display screen of smart-glass device, a see-through display, a projection-based display, an electro-chromic display, and a transparent display.

The communication network 108 may include a communication medium through which the electronic apparatus 102 and the server 104 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic apparatus 102 may be configured to control the image sensor 102a to capture the plurality of image frames. The plurality of image frames may include the first image frame, such as the first image frame 112. The first image frame may be stored on the electronic apparatus 102. In accordance with an alternate embodiment, the server 104 may be configured to receive a request from the electronic apparatus 102, via the communication network 108. The request may be a user request to access at least the first image frame from the server 104. In response to the received request, the server 104 may be configured to transmit the first image frame and the metadata associated with the first image frame to the electronic apparatus 102, via the communication network 108. Additionally, the server 104 may be further configured to transmit information associated with a plurality of categories and a plurality of scoring parameters, which may be used to categorize and score individual image frames.

The electronic apparatus 102 may be further configured to determine a first category of the first image frame. The first category may be determined from a plurality of categories defined for images. The plurality of categories may correspond to at least a set of capture modes or a type of scene in a field-of-view (FOV) of the image sensor 102a. The set of capture modes may include, but are not limited to, a landscape mode, a panorama mode, a beautification mode, a self-portrait mode, a wide angle mode, a low light mode, an autofocus mode, and a High-Dynamic-Range (HDR) mode. Also, the type of scene may include, but is not limited to, at least a landscape scene, an architectural scene, an aerial scene, a home interior scene, an outside scene, a portraiture, a sports scene, a street scene, a wildlife scene, and a macro scene.

The first category of the first image frame may be determined based on imaging information associated with at least the first image frame or an object of interest in the first image frame. As an example, the imaging information may include a number of objects of interest in the first image frame, an object type for the object of interest 112a (such as a human being type), attributes such as, a shape, a size, a dimension, an orientation, an angle of tilt, or textual information, a time and place of capture of the first image frame, and display characteristics, such as low light conditions.

The electronic apparatus 102 may be further configured to select a set of scoring parameters for the first image frame from a plurality of scoring parameters based on the determined first category. The set of scoring parameters may correspond to a set of threshold values associated with a defined visual quality for the determined first category. For the first image frame to have the defined visual quality, values for the selected set of scoring parameters should have a minimum deviation from the set of threshold values.

In some embodiments, the plurality of scoring parameters may include a first plurality of scoring parameters associated with the electronic apparatus 102. The first plurality of scoring parameters may include, but are not limited to, a focus value, an exposure value, a stability value, a shadow value, a zoom value, and an orientation value of the electronic apparatus 102 at a time of capture of the first image frame. In some other embodiments, the plurality of scoring parameters may also include a second plurality of scoring parameters associated with the first image frame. The second plurality of scoring parameters may include, but are not limited to, a brightness value, a resolution value, a saturation value, a contrast value, a white balance value, an intensity value, a tone value, a grain value, and an aspect ratio of the first image frame.

In some other embodiments, the plurality of scoring parameters may also include a third plurality of scoring parameters associated with the object of interest. The third plurality of scoring parameters may include, but are not limited to, a posture, a priority value, and a red eye value of an object of interest, such as the object of interest. The set of scoring parameters may be selected from one or more of the first plurality of scoring parameters, the second plurality of scoring parameters, and the third plurality of scoring parameters. In some other embodiments, the plurality of scoring parameters may also include, but are not limited to, a facial expression, a state of eyes, and a visibility state of the face and/or the body of the object of interest in the first image frame. The state of eyes of the object of interest may correspond to one of an open state, a partially open state, or a closed state.

The electronic apparatus 102 may be further configured to estimate score information for the selected set of scoring parameters based on a deviation of a value of at least one scoring parameter of the selected set of scoring parameters from a set of threshold values. Hereinafter, "at least one scoring parameter" may be interchangeably referred to as "one or more scoring parameters". As an example, the estimated score information may be a score value that may be an aggregate of score values for each of the selected set of scoring parameters. In certain cases, the set of threshold values may be pre-set or selected based on user inputs from the user 110 for each scoring parameter of the plurality of scoring parameters. The deviation may correspond to an amount by which a value of each of the one or more scoring parameters deviates from a corresponding threshold value for a corresponding scoring parameter. The estimated score information may be indicative of a first visual quality of the first image frame and how much the first visual quality deviates from the defined visual quality.

The electronic apparatus 102 may be further configured to output a notification based on the estimated score information for the first image frame. The notification may inform the user 110 about the first visual quality of the first image frame. The notification may be output via a specific output medium. Examples of some of the output mediums may include, but are not limited to, an audio medium, a visual medium, or an audio-visual medium. As an example, for an audio-visual medium, the electronic apparatus 102 may be configured to control the display device 106 to display the output notification. The specific output medium may be selected based on a user input from the user 110. Alternatively, the electronic apparatus 102 may be configured to select the specific output medium based on a comfort level of the user 110. For example, the user 110 may have focus on a digital viewfinder of the electronic apparatus 102 to focus on certain objects of interest. In order to prevent a diversion, the notification may be displayed as native notifications that may be seamlessly integrated with other user interface (UI) elements displayed on the digital viewfinder.

The notification may correspond to feedback on the first visual quality of the first image frame. In some embodiments, the electronic apparatus 102 may be configured to capture the second image frame such that a second visual quality of the second image frame matches the defined visual quality. The second image frame may be captured based on the estimated score information. In some embodiments, the notification may include an alert message to capture the second image frame in order to improve the visual quality of the first image frame. Additionally, in certain embodiments, the notification includes a plurality of user instructions to assist the user 110 to attempt correction of one or more issues that may cause or may have caused the deviation of the one or more scoring parameters from the set of threshold values. This may be done to ensure that the user 110 is able to capture the second image frame with the desired visual quality that matches or approximates the defined visual quality.

In accordance with an embodiment, the electronic apparatus 102 may be further configured to recapture a plurality of image frames iteratively until a visual quality of at least one recaptured image frame of the recaptured image frames matches the defined visual quality. Additionally, in some cases, the plurality of image frames may be iteratively recaptured if successive user inputs are received over unsatisfactory visual quality of a set of recaptured image frames of the recaptured plurality of image frames.

In accordance with an embodiment, the electronic apparatus 102 may be configured to receive a user input from the user 110 to select a first notification mode from a plurality of notification modes. Each notification mode of the plurality of notification modes may correspond to a different frequency of the output of the notification to the user 110. For example, a first notification mode may correspond to a one-time notification per capture of a new image frame and a second notification mode may correspond to an hourly notification rate which may include a combined feedback for all the image frames captured within that hour time frame.

In accordance with an embodiment, the electronic apparatus 102 may be configured to compute an aggregate image quality value of the first image frame. The aggregate image quality value may be an aggregate sum of score values for the selected set of scoring parameters. The aggregate image quality value may correspond to the estimated score information. The electronic apparatus 102 may be further configured to output the notification when the computed aggregate image quality value is lower than a defined value (i.e. a threshold value for the aggregate sum).

The electronic apparatus 102 may offer an accurate and automated check for errors and/or flaws in the first image frame. Further, this may reduce substantial manual editing effort of the user 110 to ensure that the first visual quality of the subsequent or successive image frames match or approximate the defined visual quality. Additionally, the electronic apparatus 102 may offer automated delivery of corrective measures via the notification. For example, the corrective measures may include one or more of a tutorial, an interactive on-guide, a set of on-screen markers, a diagnostic program, or suggestions, to assist the user 110 to shoot the second image frame that matches the defined image quality. This may also enhance the user-experience (UE) for the user 110 who may be an amateur, a hobbyist, or a professional photographer/videographer.

Figure 2:
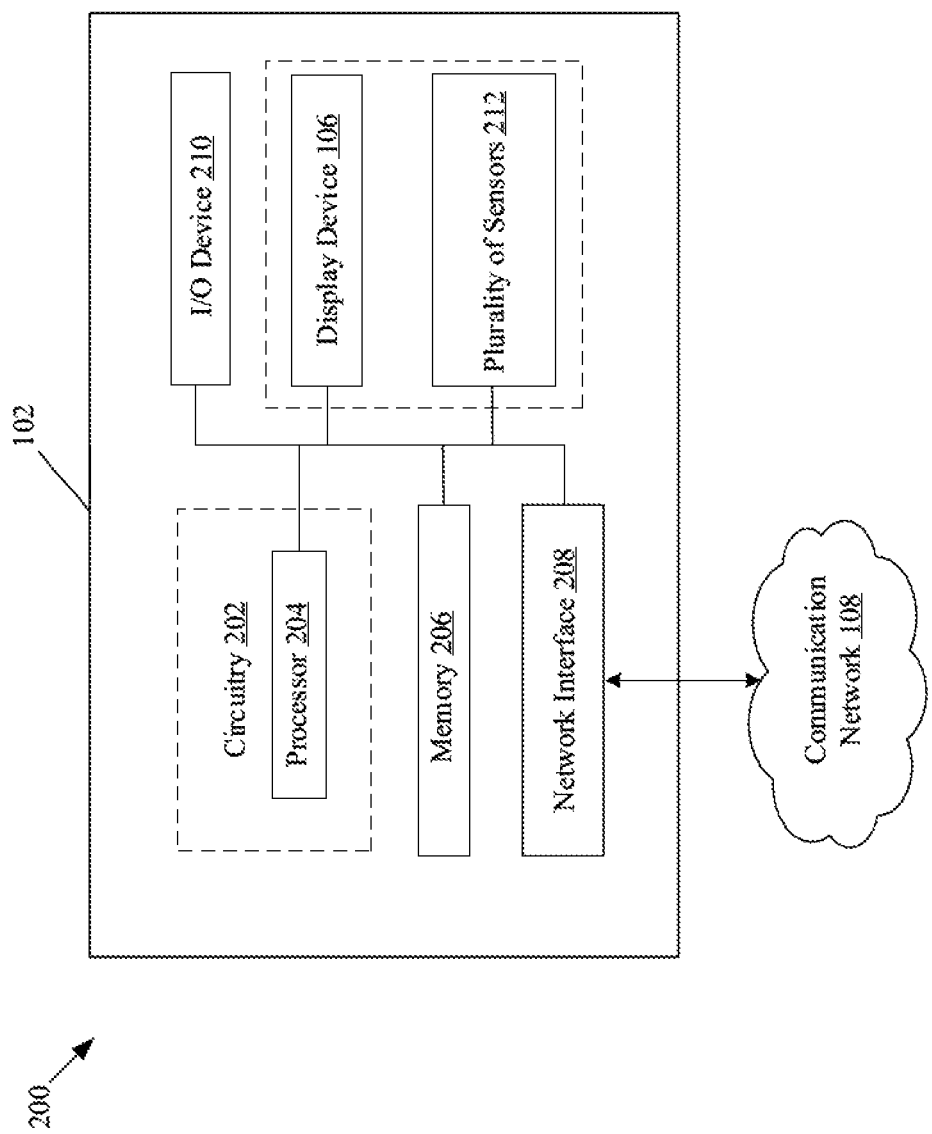
FIG. 2 is a block diagram that illustrates an exemplary electronic apparatus for delivery of notifications for feedback over visual quality of images, in accordance with an embodiment of the disclosure.

FIG. 2 is a block diagram that illustrates an exemplary electronic apparatus for delivery of notifications for feedback over visual quality of images, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202 which may include a processor 204. The electronic apparatus 102 may further include a memory 206, a network interface 208, an input/output (I/O) device 210, the display device 106, and a plurality of sensors 212. The circuitry 202 may be communicatively coupled to the memory 206, the network interface 208, the I/O device 210, the display device 106, and the plurality of sensors 212. The circuitry 202 may be configured to communicate with the server 104, by use of the network interface 208.

The circuitry 202 may comprise suitable logic, circuitry, and interfaces that may be configured to execute instructions stored in the memory 206. The circuitry 202 may be configured to estimate score information that may be indicative of a first visual quality of the first image frame and output a notification that may correspond to feedback over the first visual quality of the first image frame. The circuitry 202 may be implemented based on a number of processor technologies known in the art. Examples of the circuitry 202 may be a Graphical Processing Unit (GPU), a Central Processing Unit (CPU), X86-based processor, a Reduced Instruction Set Computing (RISC) processor, an Application-Specific Integrated Circuit (ASIC) processor, a Complex Instruction Set Computing (CISC) processor, other processors, and the like.

The processor 204 may comprise suitable logic, circuitry, and interfaces that may be configured to execute instructions stored in the memory 206. The processor 204 may be configured to estimate score information that may be indicative of the first visual quality of the first image frame and output the notification that may correspond to feedback over the first visual quality of the first image frame. In some embodiments, the processor 204 may be configured to extract information associated with the object of interest in the first image frame, using object detection and classification techniques. The object detection and classification techniques may be based on one or more of numerical computation techniques that use data flow graphs, machine learning (ML) models, or deep neural network (DNN) models, such as a convolutional neural network (CNN), a CNN-recurrent neural network (CNN-RNN), R-CNN, Fast R-CNN, Faster R-CNN, or a You Only Look Once (YOLO) network.

In some embodiments, the processor 204 may be implemented based on an ML model trained for detection and identification of behavior and preferences of an object of interest (e.g., the object of interest 112a) in the first image frame and the user 110 who is associated with the electronic apparatus 102. In such an implementation, the processor 204 may be a specialized circuitry for ML and Artificial Intelligence (AI) related operations on a data set. Additionally, the specialized circuitry may keep track of user preferences based on ML and AI related operations. The behavior and preferences may be a preferred posture of the object of interest, for example, a head tilt, or an orientation of the electronic apparatus 102 that the user 110 may prefer to capture in the first image frame. In some embodiments, the processor 204 may implement other object identification techniques, such as a human shape-based object boundary identification and a pre-specified shape-based or template based object identification by use of operators, such as a Sobel operator or a Prewitt operator. Examples of implementations of the processor 204 may include, but are not limited to, a GPU, a co-processor, a RISC processor, an ASIC processor, a CISC processor, a microcontroller, a central processing unit (CPU), or other control circuits.

The memory 206 may comprise suitable logic, circuitry, and interfaces that may be configured to store instructions that may be executed by the circuitry 202 and at least the first image frame of a plurality of image frames shot by the user 110. In some embodiments, the memory 206 may be further configured to store metadata associated with the plurality of image frames, user information, and information, such as the plurality of categories and the plurality of scoring parameters. The memory 206 may be further configured to store behavioral attributes and preferences associated with the object of interest in the first image frame and the user 110. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may comprise suitable logic, circuitry, and/or interfaces that may be configured to facilitate communication between the electronic apparatus 102 and the server 104, via the communication network 108. The network interface 208 may be implemented by use of various known technologies to support wired or wireless communication of the electronic apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer.

The I/O device 210 may comprise suitable logic, circuitry, and/or interfaces that may be configured to act as an I/O channel/interface between the user 110 and different operational components of the electronic apparatus 102. The I/O device 210 may be configured to receive the user input from the user 110. The I/O device 210 may be further configured to display the first image frame captured by the user 110 and a notification that may correspond to feedback on the first visual quality of the first image frame. The I/O device 210 may include various input and output devices, which may be configured to communicate with different operational components of the electronic apparatus 102. Examples of the I/O device 210 may include, but are not limited to, a touch screen, a keyboard, a mouse, a joystick, a microphone, and a display screen (for example, the display device 106).

The plurality of sensors 212 may comprise suitable logic, circuitry, and/or interface that may be configured to detect different parameters related to the electronic apparatus 102, the first image frame, and the object of interest in the first image frame. Examples of the different parameters may include, but are not limited to, voice commands received from the user 110, a position of the user 110 with respect to the electronic apparatus 102, a posture of the user 110, or a set of properties (e.g., orientation, aperture size, f-value, etc.) of the electronic apparatus 102. Example of sensors may include, but are not limited to, an image sensor (such as the image sensor 102a), an audio sensor (such as a microphone), an accelerometer, a gyroscope, a location sensor, such as a global navigation satellite system (GNSS) receiver, a speed sensor, an ambient light sensor, and a proximity sensor. The functions or operations executed by the electronic apparatus 102, as described in FIGS. 1 and 2, may be executed by the circuitry 202. The operations executed by the circuitry 202 are further described, for example, in the FIGS. 3 and 4.

Figure 3:
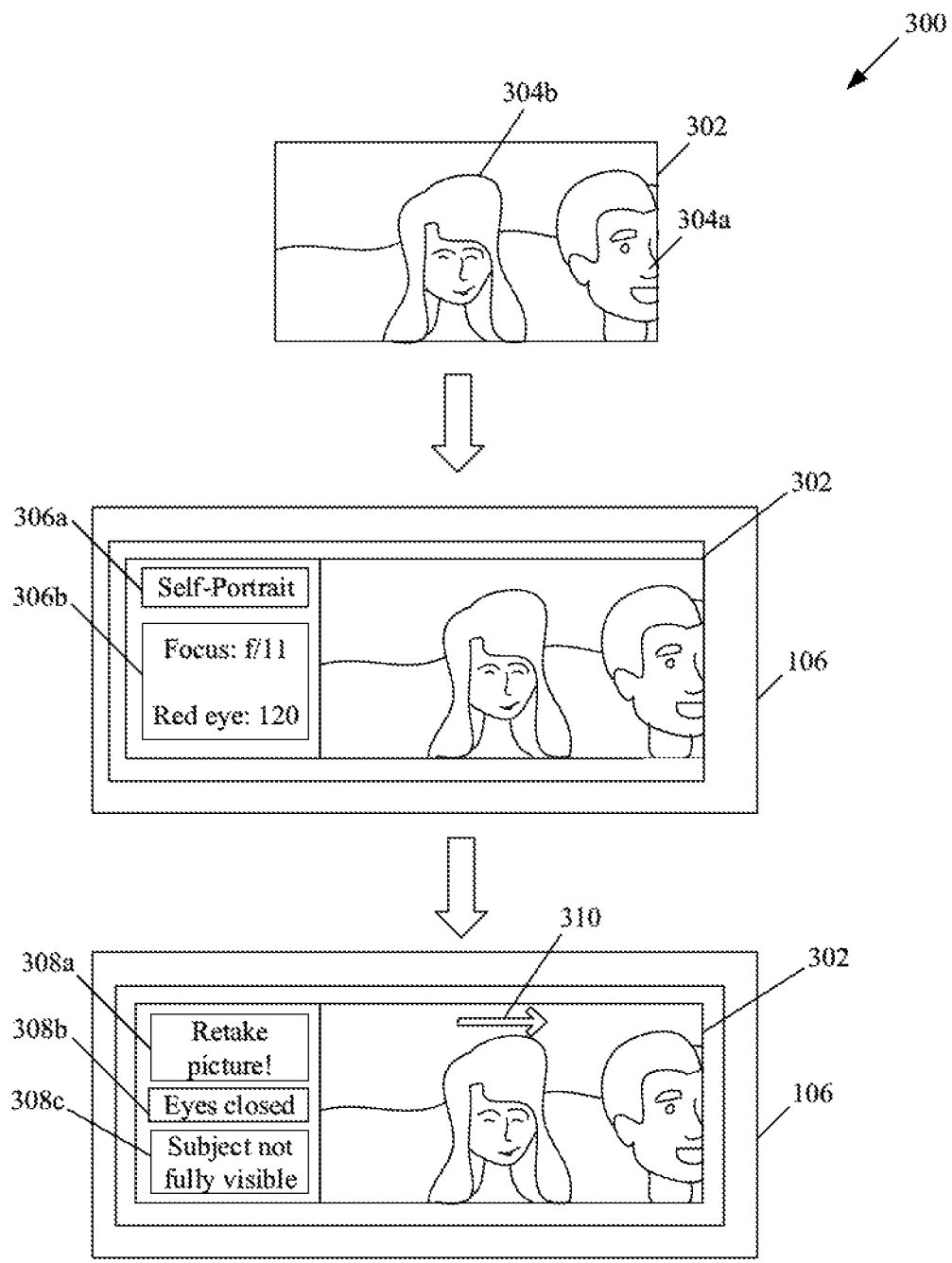
FIG. 3 illustrates an exemplary scenario for delivery of notifications for feedback over visual quality of images, in accordance with an embodiment of the disclosure.

FIG. 3 illustrates an exemplary scenario for delivery of notifications for feedback over a visual quality of images, in accordance with an embodiment of the disclosure. FIG. 3 is explained in conjunction with elements from FIG. 1 and FIG. 2. With reference to FIG. 3, there is shown an exemplary scenario 300. In the exemplary scenario 300, there is shown a first image frame 302 of a plurality of image frames that may be captured using the image sensor 102a. The first image frame 302 may include a first living object 304a and a second living object 304b. The first living object 304a and the second living object 304b may correspond to objects of interest. In FIG. 3, there is further shown the display device 106. The first image frame 302 may be displayed on a display area of the display device 106. In accordance with an embodiment, the first image frame 302 may be an image of two persons who correspond to the first living object 304a and the second living object 304b, respectively.

The processor 204 may be configured to evaluate a first visual quality for the first image frame 302. The evaluation of the first visual quality may be part of an automated quality check for the first image frame 302. The automated quality check may be initiated based on a capture of the first image frame 302 or based on a user input from the user 110. For example, a photographer who handles the electronic apparatus 102 may provide a user input to select an option for the quality check.

In accordance with an embodiment, the processor 204 may be configured to detect object(s) of interest, such as the first living object 304a and the second living object 304b in the first image frame 302. The processor 204 may be further configured to extract information associated with a plurality of categories stored in the memory 206. The plurality of categories may correspond to at least a set of capture modes or a type of scene in the FOV of the image sensor 102a. The set of capture modes may include, but are not limited to, a landscape mode, a panorama mode, a beautification mode, a self-portrait mode, a wide angle mode, a low light mode, an autofocus mode, and a High-Dynamic-Range (HDR) mode. Similarly, the type of scene may include, but are not limited to, a landscape scene, an architectural scene, an aerial scene, a home interior scene, an outside scene, a portraiture, a sports scene, a street scene, a wildlife scene, and a macro scene. In some embodiments, the processor 204 may be further configured to classify the detected object(s) of interest into different object type(s) based on different object detection techniques that may be known in the art. For example, the first living object 304a may be classified as a male human adult and the second living object 304b may be classified as a female human child.

The processor 204 may be further configured to determine a first category of the first image frame 302 based on imaging information associated with at least the first image frame 302 or the object(s) of interest, such as the first living object 304a and the second living object 304b. As an example, the processor 204 may be configured to determine that the first image frame 302 belongs to a self-portrait category of the plurality of categories. The first image frame 302 may have been captured in the self-portrait mode which may have been selected from the set of capture modes based on a user input. The selected capture mode associated with the first image frame 302 may be stored in the memory 206 as part of the imaging information. The processor 204 may be further configured to determine that the first image frame 302 belongs to the self-portrait category of the plurality of categories based on detection of the first living object 304a and the second living object 304b. The results of the detection of the first living object 304a and the second living object 304b may also be a part of the imaging information. In some cases, the processor 204 may be configured to determine that only face portions of the first living object 304a and the second living object 304b are captured in the first image frame 302 to determine the self-portrait category of the first image frame 302. The processor 204 may be further configured to display the first image frame 302 and the determined self-portrait category as a category notification 306a alongside the displayed first image frame 302 onto the display device 106.

The processor 204 may be further configured to select a set of scoring parameters for the first image frame 302 from a plurality of scoring parameters based on the determined first category of the first image frame 302. The plurality of scoring parameters may include a first plurality of scoring parameters associated with the electronic apparatus 102. The first plurality of scoring parameters may include, but are not limited to, a focus value, an exposure value, a stability value, a shadow value, a zoom value, and an orientation value of the electronic apparatus 102 at a time of capture of the first image frame 302. The plurality of scoring parameters may further include a second plurality of scoring parameters associated with the first image frame 302. The second plurality of scoring parameters may include, but are not limited to, a brightness value, a resolution value, a saturation value, a contrast value, a white balance value, an intensity value, a tone value, a grain value, and an aspect ratio of the first image frame 302. The plurality of scoring parameters may further include a third plurality of scoring parameters associated with the object(s) of interest, such as the first living object 304a and the second living object 304b. The third plurality of scoring parameters may include, but are not limited to, a posture, a priority value, and a red eye value of the object(s) of interest.

In accordance with an embodiment, the processor 204 may be configured to identify a state of eyes of the object(s) of interest, such as the first living object 304a and the second living object 304b, in the first image frame 302. In such a case, the plurality of scoring parameters may include the state of eyes of the object(s) of interest. The state of eyes of the object(s) of interest may correspond to one of an open state, a partially open state, or a closed state. In accordance with another embodiment, the processor 204 may be configured to identify a facial expression of the object(s) of interest, such as the first living object 304a and the second living object 304b, in the first image frame 302. In such a case, the plurality of scoring parameters may include the facial information, such as a facial expression. In accordance with another embodiment, the processor 204 may be configured to compute an angle and an orientation of a face of the object(s) of interest, such as the first living object 304a and the second living object 304b, in the first image frame 302. In such a case, the plurality of scoring parameters may include the angle or the orientation of the face of the object(s) of interest.

In accordance with another embodiment, the processor 204 may be configured to estimate a first visibility state of the face of the object(s) of interest, such as the first living object 304a and the second living object 304b, in the first image frame 302. In such a case, the plurality of scoring parameters may include the first visibility state of the face of the object(s) of interest. The first visibility state may correspond to one of a partially visible state, a completely visible state, or a hidden state of the face of the object(s) of interest. In accordance with another embodiment, the processor 204 may be configured to estimate a second visibility state of the body of the object(s) of interest, such as the first living object 304a and the second living object 304b, in the first image frame 302. The second visibility state may correspond to one of a partially visible state, a completely visible state, or a hidden state of the body of the object(s) of interest. In such a case, the plurality of scoring parameters may include the second visibility state of the body of the object(s) of interest.

In accordance with an embodiment, the processor 204 may be configured to estimate an obstruction state of a region of interest which includes the object(s) of interest (such as the first living object 304a and the second living object 304b) in the first image frame 302. In such a case, the plurality of scoring parameters may include the obstruction state of the region of interest which includes the object(s) of interest in the first image frame 302. In the obstruction state, a second object (i.e. an obstructing object) in the first image frame 302 may obstruct the region of interest. For example, a flying bird may obstruct a face, i.e. a region of interest, at a time when the first image frame 302 is captured.

Each category of the plurality of categories may correspond to a set of scoring parameters. For example, the self-portrait category for the first image frame 302 may correspond to a focus value, a brightness value, and a red eye value of the object(s) of interest (such as the first living object 304a and the second living object 304b). The self-portrait category may further correspond to the first visibility state of the face, the second visibility state of the body, the facial expression, and the state of eyes of the object(s) of interest, such as the first living object 304a and the second living object 304b.

The set of scoring parameters may correspond to a set of threshold values associated with a defined visual quality for the determined first category. For example, a threshold value for the focus value as a scoring parameter in the self-portrait category may be "f/5.6" and a threshold value for the red eye value as a scoring parameter in the self-portrait category may be "20". Furthermore, an acceptable state of eyes in the self-portrait mode may correspond to an open state. The acceptable first visibility state of the face in the self-portrait category may correspond to a completely visible state.

The processor 204 may be further configured to estimate score information for the selected set of scoring parameters based on a deviation of a value of each of one or more scoring parameters of the selected set of scoring parameters from the set of threshold values. For example, the estimated score information for the first image frame 302 may be in a range of "0 to 1" for each of a focus value of "f/11" and a red eye value of "120". A greater positive deviation or negative deviation based on a difference between the value of a scoring parameter and a corresponding threshold value may correspond to a low score. Similarly, a small or negligible deviation based on the difference between the value of a scoring parameter and a corresponding threshold value may correspond to a high score.

The processor 204 may be further configured to display the determined score information on the display device 106 as a score notification 306b alongside the displayed first image frame 302 and the category notification 306a. In some embodiments, the processor 204 may be further configured to estimate the score information for other scoring parameters, such as state of the eyes and the obstruction state, for the first image frame 302. The processor 204 may be further configured to identify the state of eyes, the facial expression, the angle and the orientation of the face, the first visibility state of the face, the second visibility state of the body, and the obstruction state of the object(s) of interest, such as the first living object 304a and the second living object 304b, in the first image frame 302. As an example, the state of eyes of the second living object 304b may be in a closed state which may not be an acceptable state for the self-portrait category. Similarly, the first visibility state of the face of the first living object 304a may be a partially visible state which may not be an acceptable state for the self-portrait category.

The processor 204 may be further configured to output a notification, such as a first feedback notification 308a, a second feedback notification 308b, and a third feedback notification 308c, based on the estimated score information. The first feedback notification 308a, the second feedback notification 308b, and the third feedback notification 308c may correspond to feedback on a first visual quality of the first image frame 302. The score information for the focus value and the red eye value may be within an acceptable range. Whereas, the score information for the state of the eyes and the first visibility state of the face may be unacceptable. The notification may include a positive feedback for the acceptable score information and a negative feedback for the unacceptable score information. As an example, the notification may include information to inform the user 110 about one or more issues that may have caused the deviation of the one or more scoring parameters from the set of threshold values. For the first image frame 302, the first feedback notification 308a may be "Retake picture!" that may correspond to a recommendation associated with the first visual quality of the first image frame 302. Similarly, the second feedback notification 308b may be "eyes closed" that may correspond to a closed state of eyes of the second living object 304b and the third feedback notification 308c may be "subject not fully visible" that may correspond to a partially visible state of the face of the first living object 304a.

In some embodiments, the processor 204 may be configured to compute an aggregate image quality value of the first image frame 302 based on the estimated score information for the selected set of scoring parameters. In such a case, the processor 204 may be configured to output the notification based on the computed aggregate image quality value. The processor 204 may be configured to output negative feedback in the notification if the aggregate image quality value is less than a determined threshold value. For example, if the aggregate image quality value for the first image frame 302 is less than the determined threshold values, the processor 204 may be configured to output the notification on the display device 106. The aggregate image quality value may be computed based on the score information for the focus value, the red eye value, the state of the eyes, and the first visibility state of the eyes.

In some embodiments, the notification may include an alert message to capture a second image frame. As shown, the first feedback notification 308a may include the alert message "Retake picture" or "Recapture" for the user 110 to initiate capture of the second image frame to correct the mistakes of the first image frame 302. The processor 204 may be further configured to capture the second image frame such that a second visual quality of the second image frame matches the defined visual quality. The second image frame may be captured based on the estimated score information.

In some embodiments, the processor 204 may be configured to apply a machine learning (ML) model on a past data set. The past data set may include the image frames captured by the user in the past. The processor 204 may be configured to recognize patterns in the user's behavior based on based on application of ML model on the past data set. Examples of machine learning models may include, but are not limited to, deep neural network (DNN) models, regression models, k-nearest neighbor models, random forest, and heuristic models. For example, the user may have done a head-tilt or closed-eyes in multiple image frames captured in the past in a self-portrait mode. The processor 204 may be configured to determine that the head-tilt or the closed-eyes may be a preferred pose or a habit for the user, using the ML model. Typically, the head-tilt may be treated as an error. However, in some embodiments, the processor 204 may be configured to ignore such errors in the captured first image frame 302 for the particular user based on the past data set. Also, the processor 204 may be configured to skip generation of the notification for the user to retake the image frame 302 in case the head-tilt or closed-eyes is detected.

In accordance with another embodiment, the notification may further include a plurality of user instructions to assist the user 110 to attempt correction of one or more issues that may cause (or may have caused) the deviation of the one or more scoring parameters from the set of threshold values. For example, an indicator 310 may be displayed as an arrow that may correspond to a direction in which the user 110 should move the image sensor 102a to capture the second image frame such that the complete face of the first living object 304a is captured. The indicator 310 may be displayed on the display device 106.

In accordance with an embodiment, the processor 204 may activate, from a plurality of notification modes, a first notification mode that corresponds to a first frequency of the output of the notification based on user input. Each notification mode of the plurality of notification modes may correspond to a different frequency of the output of the notification to the user 110. For example, a first notification mode may correspond to a notification frequency where a notification is displayed after every image frame. Similarly, a second notification mode may correspond to a notification frequency where notifications are displayed cumulatively for a number of image frames and a third notification mode may correspond to a notification frequency where a notification is displayed only after a certain time period.

Figure 4:
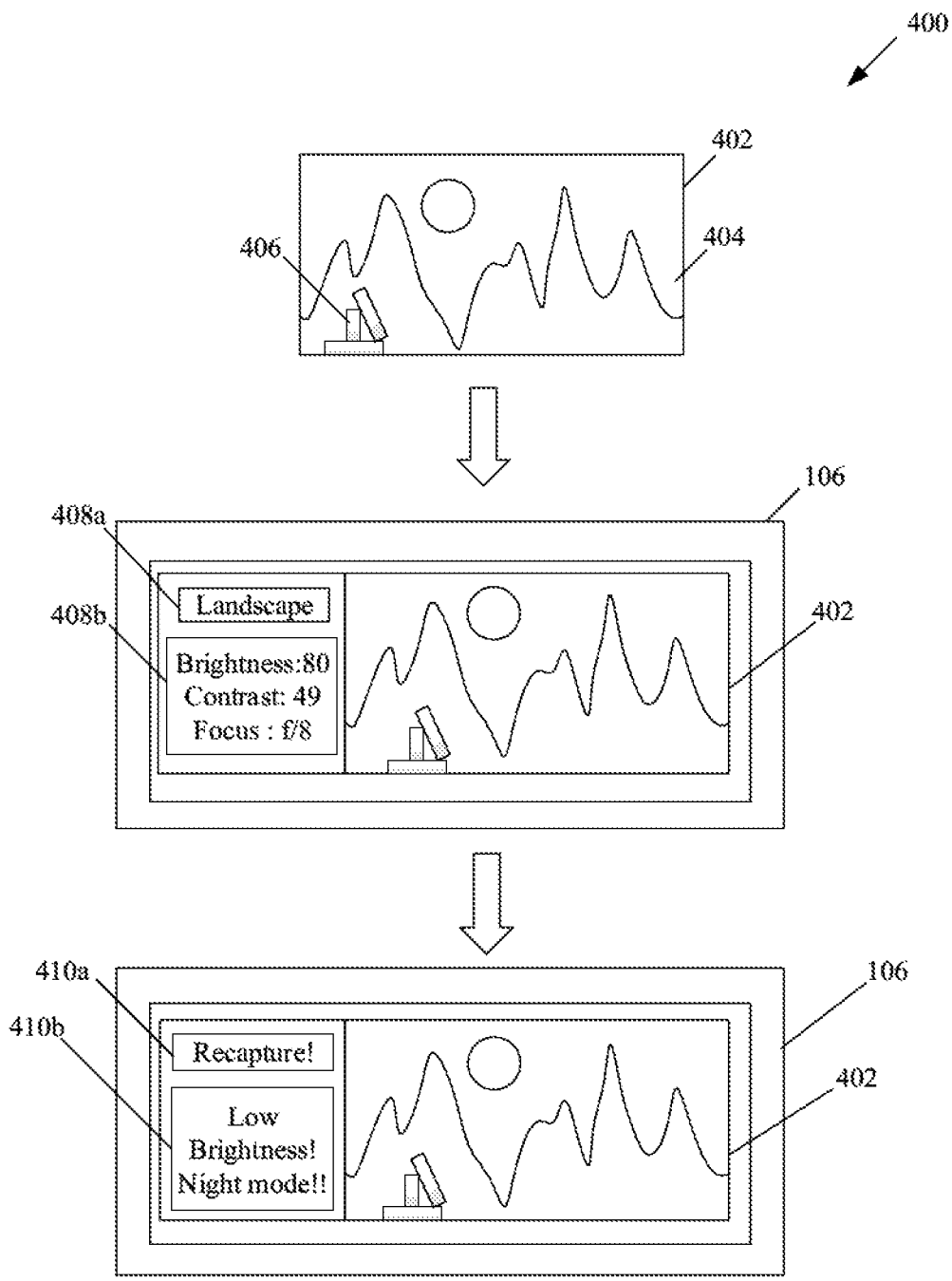
FIG. 4 illustrates an exemplary scenario for delivery of notifications for feedback over visual quality of images, in accordance with an embodiment of the disclosure.

FIG. 4 illustrates an exemplary scenario for delivery of notifications for feedback over visual quality of images, in accordance with an embodiment of the disclosure. FIG. 4 is explained in conjunction with elements from FIGS. 1, 2, and 3. With reference to FIG. 4, there is shown an exemplary scenario 400. In the exemplary scenario 400, there is shown a first image frame 402 of the plurality of image frames. There is also shown the electronic apparatus 102 that includes the display device 106. The first image frame 402 may be displayed on a display area of the display device 106. The first image frame 402 may include a first scene 404. The first scene 404 may include an object of interest 406, such as a statue. The first image frame 402 may be an image of a statue with a landscape in the background.

The processor 204 may be configured to evaluate a visual quality check on the first image frame 402. The visual quality check may be automated based on capture of the first image frame 402 by the image sensor 102a or may be manual i.e. based on a user input from the user 110. For example, the user 110 may be a photographer of the first image frame 402 who may have handled the electronic apparatus 102. For the visual quality check, the processor 204 may be configured to retrieve the first image frame 402 from the memory 206. The processor 204 may be further configured to detect the object of interest 406 and the first scene 404 from the first image frame 402 and classify the detected object into an object type based on different object detection techniques that may be known in the art.

The processor 204 may be further configured to determine a first category of the first image frame 402 based on imaging information associated with at least the first image frame 402. The processor 204 may be configured to determine that the first image frame 402 belongs to a landscape category of the plurality of categories based on detection of a landscape mode selected by the user 110 from the set of capture modes. The processor 204 may be further configured to determine that the first image frame 402 belongs to the landscape category based on an identification of different components of the first scene 404. The capture mode associated with the first image frame 402 and information associated with the identification of the first scene 404 may be stored in the memory 206 as the imaging information. In some cases, the processor 204 be configured to determine the landscape mode of the first image frame 402 based on features (e.g., mountains, sun, etc.) captured in a wide angle in the first image frame 402. The processor 204 may be further configured to display the first image frame 402 and the determined landscape category on the display device 106 as a category notification 408a with the first image frame 402.

The processor 204 may be further configured to select a set of scoring parameters for the first image frame 402 from a plurality of scoring parameters based on the determined first category. Each category of the plurality of categories may correspond to a set of scoring parameters. For example, the landscape category determined for the first image frame 402 may correspond to a focus parameter, a brightness parameter, and a contrast parameter as the selected set of scoring parameters. The set of scoring parameters may correspond to a set of threshold values associated with a defined visual quality for the determined first category, i.e. the landscape category for the first image frame 402. For example, threshold values for the focus parameter, the brightness parameter, and the contrast parameter (a perceptual contrast) in the landscape category may be, for example, "f/11", "50", and "70".

The processor 204 may be further configured to estimate score information for the selected set of scoring parameters based on a deviation of a value of each of one or more scoring parameters of the selected set of scoring parameters from the set of threshold values. For example, the first image frame 402 may have a focus value of "f/8", a contrast value of "49", and a brightness value of "80". The focus value of "f/8" and the brightness value of "80" deviate from threshold values of "f/11" and "70", respectively. Whereas, a deviation of the contrast value of "49" from the threshold value of "50" is negligible. Thus, the score information may include a lower score, such as "0.6" and "0.7", for the focus parameter and the brightness parameter, respectively and a higher score, such as "0.95", for the contrast parameter. In some embodiments, the estimated score information may be a weighted average of scores from each of the focus parameter, the contrast parameter, and the brightness parameter. In other cases, each individual score may be independently treated as part of the score information.

The processor 204 may be further configured to display the estimated score information on the display device 106 as a scoring notification 408b alongside the displayed first image frame 402 and the category notification 408a. In accordance with an embodiment, the processor 204 may be further configured to output a notification, such as a first feedback notification 410a and a second feedback notification 410b, based on the estimated score information. The first feedback notification 410a and the second feedback notification 410b may correspond to feedback on a first visual quality of the first image frame 402. For example, the notification may include a positive feedback for the acceptable score information and a negative feedback for the unacceptable score information.

In some embodiments, the processor 204 may be further configured to compute an aggregate image quality value of the first image frame 402 based on the calculated score information and output the notification based on the computed aggregate image quality value. The processor 204 may be configured to output a negative feedback through the notification if the aggregate image quality value is less than a determined threshold value.

The first feedback notification 410a may include an alert message to capture a second image frame. The first feedback notification 410a may include the alert message "Retake picture" or "Recapture" for the user 110 to initiate capture of the second image frame to correct the mistakes in the first image frame 402. The processor 204 may be further configured to capture the second image frame such that a second visual quality of the second image frame matches a desirable visual quality. Similarly, the second feedback notification 410b may be displayed to inform the user 110 about the one or more issues that may cause (or may have caused) the deviation of the one or more scoring parameters from the set of threshold values. For example, for the first image frame 402, the second feedback notification 410b may be a "Low Brightness! Night mode!!" message. This may inform the user 110 about a brightness issue with the first image frame 402.

In some embodiments, the notification may further include a plurality of user instructions to assist the user 110 to attempt correction of one or more issues that may cause the deviation of the one or more scoring parameters from the set of threshold values. For example, the second feedback notification 410b may include a prompt message of "Night mode!!" that correspond to a mode that should be selected to capture the second image frame to ensure that the low brightness issue is resolved.

In an embodiment, a threshold number of retake notification may be stored in the memory 206. The threshold number of retakes may be specified by the user as a user input. Alternatively, the processor 204 may be configured to determine the threshold number of retakes based on application of a ML model on a past data set. Examples of ML model may include, but are not limited to, DNN models, regression models, k-nearest neighbor models, random forest, and heuristic models. The past data set may include information, such as an average number of retakes or a maximum number of retakes taken by the user of the electronic apparatus 102 for capture of the second image in the past. In cases where the retakes of the first image frame 402 exceed a threshold number of retakes and the image quality of all the retakes of the first image frame 402 is substantially similar to each other and remains below the defined image quality, the processor 204 may be configured to stop the notification, such as the first feedback notification 308a to the user. This may be typically observed when most of the retakes exhibit same errors without any improvement in the image quality of the retakes. The processor 204 may be further configured to select an image frame with the highest quality or least number of errors from all the retakes of the first image frame 402 and output the selected image frame to the user.

In an alternate embodiment, the processor 204 may be further configured to perform automated correction and correct the errors in the first image frame and output the corrected first image frame to the user after the retakes of the first image frames exceed the threshold number of retakes. For example, the processor 204 may be configured to adjust the brightness of the first image frame 402. The processor 204 may be further configured to output the corrected first image frame 402 instead of the negative feedback notification, such as the second feedback notification 410b.

Figure 5:
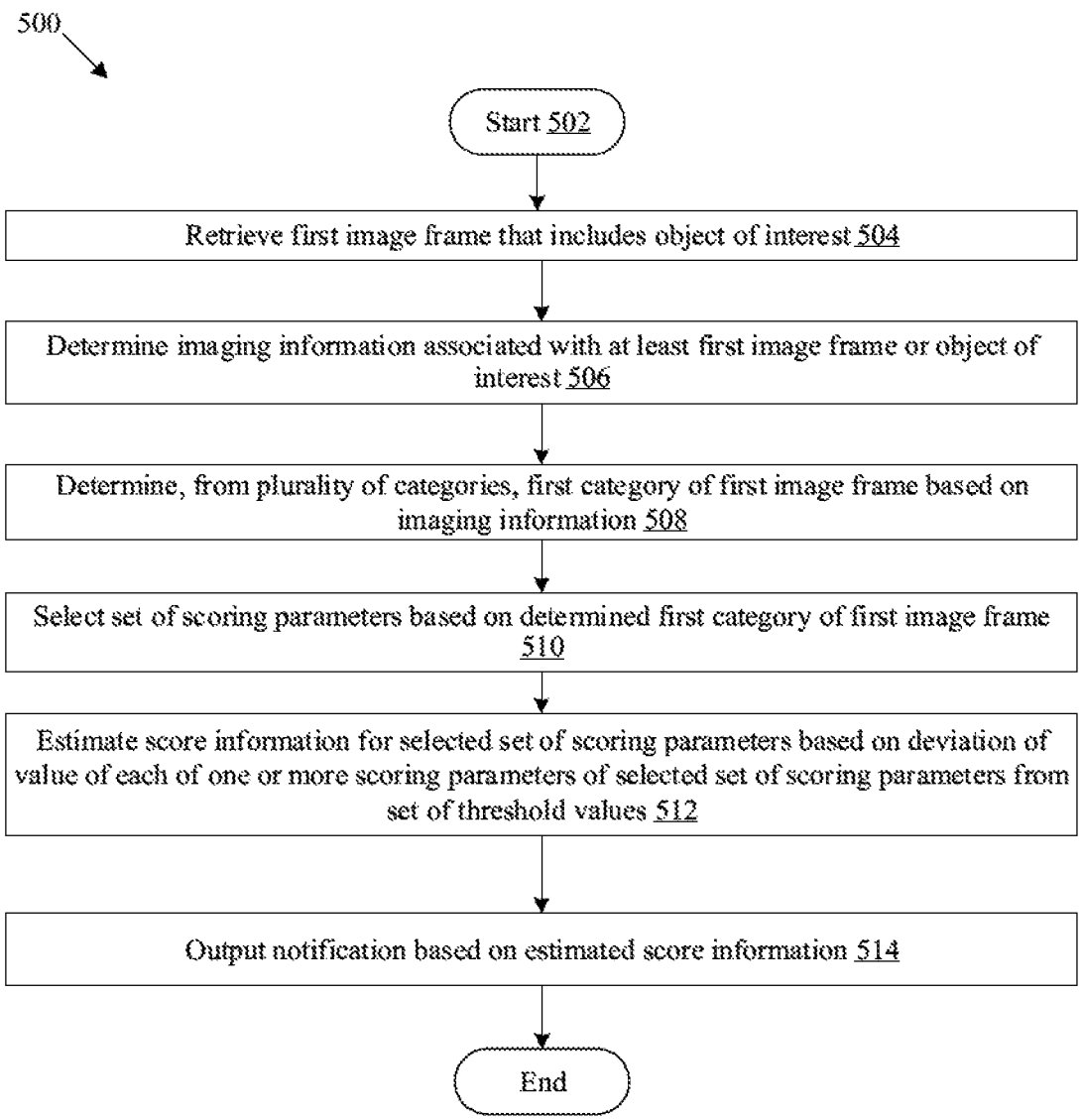
FIG. 5 depicts a flowchart that illustrates exemplary operations for delivery of notifications for feedback over visual quality of images, in accordance with an embodiment of the disclosure.

FIG. 5 depicts a flowchart that illustrates exemplary operations for delivery of notifications for feedback over visual quality of images, in accordance with an embodiment of the disclosure. FIG. 5 is explained in conjunction with elements from FIGS. 1, 2, 3, and 4. With reference to FIG. 5, there is shown a flowchart 500. The operations from 502 to 514 may be implemented on the electronic apparatus 102. The operations starts at 502 and proceeds to 504.

At 504, a first image frame that includes an object of interest may be retrieved. The processor 204 may be configured to retrieve the first image frame that may include an object of interest from the memory 206. The first image frame may be captured by the image sensor 102a.

At 506, imaging information associated with at least the first image frame or the object of interest may be determined. The processor 204 may be configured to determine the imaging information associated with at least the first image frame or the object of interest in the first image frame. The imaging information may correspond to characteristics of the first image frame or the object of interest. The determination of the imaging information is described in detail, for example, in FIGS. 3 and 4.

At 508, a first category of the first image frame may be determined from a plurality of categories based on the imaging information. The processor 204 may be configured to determine the first category of the first image frame from a plurality of categories based on the imaging information. The plurality of categories may correspond to at least a set of capture modes or a type of scene in a FOV of the image sensor 102a. The set of capture modes may include, but are not limited to, a landscape mode, a panorama mode, a beautification mode, a self-portrait mode, a wide angle mode, a low light mode, an autofocus mode, and a High-Dynamic-Range (HDR) mode. The determination of the first category is described in detail, for example, in FIGS. 3 and 4.

At 510, a set of scoring parameters may be selected based on the determined first category of the first image frame. In accordance with an embodiment, processor 204 may be configured to select the set of scoring parameters based on the determined first category of the first image frame. The plurality of scoring parameters may include a first plurality of scoring parameters, a second plurality of scoring parameters, and a third plurality of scoring parameters associated with the electronic apparatus 102, the first image frame, and the object of interest, respectively. The selection of the set of scoring parameters is described in detail, for example, in FIGS. 3 and 4.

At 512, score information for the selected set of scoring parameters may be estimated based on a deviation of a value of each of one or more scoring parameters of the selected set of scoring parameters from a set of threshold values. The processor 204 may be configured to estimate the score information for the selected set of scoring parameters based on a deviation of a value each the one or more scoring parameters of the selected set of scoring parameters from a set of threshold values.

At 514, a notification may be output based on the estimated score information. The processor 204 may be configured to output the notification based on the estimated score information. The notification may be displayed on the display device 106. The notification may be an audio notification, a textual notification, a visual notification, an audio-visual notification, or a haptic feedback. Control passes to end.

Various embodiments of the disclosure may provide a non-transitory computer-readable medium having stored thereon, computer implemented instructions that when executed by an electronic apparatus, causes the electronic apparatus to execute operations for delivery of notifications for feedback over visual quality of images. The operations may include determination of a first category of the first image frame from a plurality of categories based on imaging information associated with at least the first image frame or the object of interest. The operations may further include a selection of a set of scoring parameters for the first image frame from a plurality of scoring parameters based on the determined first category. The set of scoring parameters may correspond to a defined visual quality for the determined first category. The operations may further include estimation of score information for the selected set of scoring parameters based on a deviation of a value of each of one or more scoring parameters of the selected set of scoring parameters from a set of threshold values. The operations may further include an output of a notification based on the estimated score information. The notification may correspond to feedback on a visual quality of the first image frame.

In accordance with an embodiment, the plurality of scoring parameters may include a first plurality of scoring parameters associated with the electronic apparatus. The first plurality of scoring parameters may include, but are not limited to, a focus value, an exposure value, a stability value, a shadow value, a zoom value, and an orientation value of the electronic apparatus at a time of a capture of the first image frame. In accordance with an embodiment, the plurality of scoring parameters may further include a second plurality of scoring parameters associated with the first image frame. The second plurality of scoring parameters may include, but are not limited to, a brightness value, a resolution value, a saturation value, a contrast value, a white balance value, an intensity value, a tone value, a grain value, and an aspect ratio of the first image frame.

Exemplary aspects of the disclosure may include the electronic apparatus 102 that includes the memory 206 configured to store a first image frame. The first image frame may include an object of interest. The electronic apparatus 102 may further include the circuitry 202 configured to determine, from a plurality of categories, a first category of the first image frame based on imaging information associated with at least the first image frame or the object of interest. The circuitry 202 may be further configured to select a set of scoring parameters for the first image frame from a plurality of scoring parameters based on the determined first category. The set of scoring parameters may correspond to a defined visual quality for the determined first category. The circuitry 202 may be further configured to estimate score information for the selected set of scoring parameters based on a deviation of a value of each of one or more scoring parameters of the selected set of scoring parameters from a set of threshold values. The circuitry 202 may be further configured to output a notification based on the estimated score information. The notification may correspond to feedback on a visual quality of the first image frame.

In accordance with an embodiment, the plurality of categories may correspond to at least a set of capture modes or a type of scene in a FOV of the image sensor 102a. The set of capture modes may include, but are not limited to, a landscape mode, a panorama mode, a beautification mode, a self-portrait mode, a wide angle mode, a low light mode, an autofocus mode, and a High-Dynamic-Range (HDR) mode. Similarly, the type of scene may include, but are not limited to, at least a landscape scene, an architectural scene, an aerial scene, a home interior scene, an outdoor scene, a portraiture, a sports scene, a street scene, a wildlife scene, and a macro scene.

In accordance with an embodiment, the plurality of scoring parameters may include a first plurality of scoring parameters associated with the electronic apparatus 102. The first plurality of scoring parameters may include, but are not limited to, a focus value, an exposure value, a stability value, a shadow value, a zoom value, and an orientation value of the electronic apparatus 102 at a time of a capture of the first image frame. In accordance with an embodiment, the plurality of scoring parameters may further include a second plurality of scoring parameters associated with the first image frame. The second plurality of scoring parameters may include, but are not limited to, a brightness value, a resolution value, a saturation value, a contrast value, a white balance value, an intensity value, a tone value, a grain value, and an aspect ratio of the first image frame. In accordance with an embodiment, the plurality of scoring parameters may further include a third plurality of scoring parameters associated with the object of interest. The third plurality of scoring parameters may include, but are not limited to, a posture, a priority value, and a red eye value of the object of interest.

In accordance with an embodiment, the circuitry 202 may be further configured to identify a state of eyes of the object of interest in the first image frame. The plurality of scoring parameters may further include the state of eyes of the object of interest. The state of the eyes of the object of interest may correspond to one of an open state, a partially open state, or a closed state. In accordance with an embodiment, the circuitry 202 may be further configured to identify a facial expression of the object of interest in the first image frame. The plurality of scoring parameters may further include the facial expression of the object of interest.

In accordance with an embodiment, the circuitry 202 may be further configured to compute an angle and an orientation of a face of the object of interest. The plurality of scoring parameters may further include the angle and the orientation of the face of the object of interest.

In accordance with an embodiment, the circuitry 202 may be further configured to estimate a first visibility state of a face of the object of interest in the first image frame. The plurality of scoring parameters may further include the first visibility state of the face. The first visibility state may correspond to one of a partially visible state, a completely visible state, or a hidden state of the face. In accordance with another embodiment, the circuitry 202 may be further configured to estimate a second visibility state of a body of the object of interest. The plurality of scoring parameters may further include the second visibility state of the body. The second visibility state may correspond to one of a partially visible state, a completely visible state, or a hidden state of the body.

In accordance with an embodiment, the circuitry 202 may be further configured to estimate an obstruction state of a region of interest in the first image frame. A second object in the first image frame may obstruct the region of interest in the obstruction state. The plurality of scoring parameters may further include the obstruction state of the region of interest. In accordance with an embodiment, the circuitry 202 may be further configured to capture a second image frame such that the visual quality of the second image frame matches the defined visual quality. The second image frame may be captured based on the estimated score information.

In accordance with an embodiment, the circuitry 202 may be further configured to receive a user input and activate, from a plurality of notification modes, a first notification mode that corresponds to a first frequency of the output of the notification based on the received user input. Each notification mode of the plurality of notification modes may correspond to a different frequency of the output of the notification. In accordance with an embodiment, the notification may include an alert message to capture a second image frame. In accordance with another embodiment, the notification may further include a plurality of user instructions to assist the user 110 to attempt correction of one or more issues that may cause the deviation of the one or more scoring parameters from the set of threshold values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic apparatus, comprising:
a memory configured to store a first image frame that comprises an object of interest; and
circuitry configured to:
determine, from a plurality of categories, a first category of the first image frame based on imaging information associated with at least one of the first image frame or the object of interest, wherein
the plurality of categories corresponds to a set of capture modes, and
the set of capture modes comprises a landscape mode, a panorama mode, a beautification mode, a self-portrait mode, a wide angle mode, a low light mode, an autofocus mode, and a High-Dynamic-Range (HDR) mode;

select a set of scoring parameters for the first image frame from a plurality of scoring parameters based on the determined first category, wherein the set of scoring parameters corresponds to a set of threshold values associated with a defined visual quality for the determined first category;

estimate score information for the set of scoring parameters based on a deviation of a value of at least one scoring parameter of the set of scoring parameters from a corresponding threshold value of the set of threshold values; and output a notification based on the estimated score information, wherein the notification corresponds to feedback on a first visual quality of the first image frame.

2. The electronic apparatus according to claim 1, wherein the plurality of categories corresponds to a type of scene in a field-of-view (FOV) of an image sensor.

3. The electronic apparatus according to claim 2, wherein the type of scene comprises at least a landscape scene, an architectural scene, an aerial scene, a home interior scene, an outside scene, a portraiture, a sports scene, a street scene, a wildlife scene, and a macro scene.

4. The electronic apparatus according to claim 1, wherein the plurality of scoring parameters comprises a first plurality of scoring parameters associated with the electronic apparatus, and the first plurality of scoring parameters comprises at least a focus value, an exposure value, a stability value, a shadow value, a zoom value, and an orientation value of the electronic apparatus at a time of capture of the first image frame.

5. The electronic apparatus according to claim 1, wherein the plurality of scoring parameters comprises a second plurality of scoring parameters associated with the first image frame, and the second plurality of scoring parameters comprises at least a brightness value, a resolution value, a saturation value, a contrast value, a white balance value, an intensity value, a tone value, a grain value, and an aspect ratio of the first image frame.

6. The electronic apparatus according to claim 1, wherein the plurality of scoring parameters comprises a third plurality of scoring parameters associated with the object of interest, and the third plurality of scoring parameters comprises at least a posture, a priority value, and a red eye value of the object of interest.

7. The electronic apparatus according to claim 1, wherein the circuitry is further configured to identify a state of eyes of the object of interest in the first image frame, the plurality of scoring parameters further comprises the state of eyes of the object of interest, and the state of eyes of the object of interest corresponds to one of an open state, a partially open state, or a closed state.

8. The electronic apparatus according to claim 1, wherein the circuitry is further configured to identify a facial expression of the object of interest in the first image frame, and the plurality of scoring parameters further comprises the facial expression of the object of interest.

9. The electronic apparatus according to claim 1, wherein the circuitry is further configured to compute an angle and an orientation of a face of the object of interest, and the plurality of scoring parameters further comprises the angle and the orientation of the face of the object of interest.

10. The electronic apparatus according to claim 1, wherein the circuitry is further configured to estimate a visibility state of a face of the object of interest in the first image frame, the plurality of scoring parameters further comprises the first visibility state of the face, and the visibility state corresponds to one of a partially visible state, a completely visible state, or a hidden state of the face.

11. The electronic apparatus according to claim 1, wherein the circuitry is further configured to estimate a visibility state of a body of the object of interest, the plurality of scoring parameters further comprises the visibility state of the body, and the visibility state corresponds to one of a partially visible state, a completely visible state, or a hidden state of the body.

12. The electronic apparatus according to claim 1, wherein the circuitry is further configured to estimate an obstruction state of a region of interest which includes the object of interest in the first image frame, in the obstruction state, an obstructing object in the first image frame obstructs the region of interest, and the plurality of scoring parameters further comprises the obstruction state of the region of interest.

13. The electronic apparatus according to claim 1, wherein the circuitry is further configured to capture a second image frame such that a second visual quality of the second image frame matches the defined visual quality, and the second image frame is captured based on the estimated score information.

14. The electronic apparatus according to claim 1, wherein the circuitry is further configured to:

receive a user input; and activate, from a plurality of notification modes, a first notification mode that corresponds to a first frequency of the output of the notification, wherein the first notification mode is activated based on the received user input, and each notification mode of the plurality of notification modes corresponds to a different frequency of the output of the notification.

15. The electronic apparatus according to claim 1, wherein the notification comprises an alert message to capture a second image frame.

16. The electronic apparatus according to claim 1, wherein the notification comprises a plurality of user instructions to assist a user to correct at least one issue associated with the deviation of the value of the at least one scoring parameter.

17. A method, comprising:

in an electronic apparatus:

determining, from a plurality of categories, a first category of an image frame based on imaging information associated with at least one of the image frame or an object of interest in the image frame, wherein the plurality of categories corresponds to a set of capture modes, and the set of capture modes comprises a landscape mode, a panorama mode, a beautification mode, a self-portrait mode, a wide angle mode, a low light mode, an autofocus mode, and a High-Dynamic-Range (HDR) mode;

selecting a set of scoring parameters for the first image frame from a plurality of scoring parameters based on the determined first category, wherein the set of scoring parameters corresponds to a set of threshold values associated with a defined visual quality for the determined first category;

estimating score information for the set of scoring parameters based on a deviation of a value of at least one scoring parameter of the set of scoring parameters from a corresponding threshold value of the set of threshold values; and outputting a notification based on the estimated score information, wherein the notification corresponds to feedback on a visual quality of the image frame.

18. A non-transitory computer-readable medium having stored thereon, computer implemented instructions that when executed by an electronic apparatus, causes the electronic apparatus to execute operations, the operations comprising:

determining, from a plurality of categories, a first category of an image frame based on imaging information associated with at least one of the image frame or an object of interest in the image frame, wherein the plurality of categories corresponds to a set of capture modes, and the set of capture modes comprises a landscape mode, a panorama mode, a beautification mode, a self-portrait mode, a wide angle mode, a low light mode, an autofocus mode, and a High-Dynamic-Range (HDR) mode;

selecting a set of scoring parameters for the first image frame from a plurality of scoring parameters based on the determined first category, wherein the set of scoring parameters corresponds to a set of threshold values associated with a defined visual quality for the determined first category;

estimating score information for the set of scoring parameters based on a deviation of a value of at least one scoring parameter of the set of scoring parameters from a corresponding threshold value of the set of threshold values; and outputting a notification based on the estimated score information, wherein the notification corresponds to feedback on a visual quality of the image frame.

19. The non-transitory computer-readable medium according to claim 18, wherein the plurality of scoring parameters comprises a first plurality of scoring parameters associated with the electronic apparatus, and the first plurality of scoring parameters comprises at least a focus value, an exposure value, a stability value, a shadow value, a zoom value, and an orientation value of the electronic apparatus at a time of capture of the image frame.

20. The non-transitory computer-readable medium according to claim 18, wherein the plurality of scoring parameters comprises a second plurality of scoring parameters associated with the image frame, and the second plurality of scoring parameters comprises at least a brightness value, a resolution value, a saturation value, a contrast value, a white balance value, an intensity value, a tone value, a grain value, and an aspect ratio of the image frame.

* * * * *